Nov. 18, 1969  E. JENNY ET AL  3,479,537
MAGNETOHYDRODYNAMIC MACHINE
Filed July 6, 1966  2 Sheets-Sheet 1
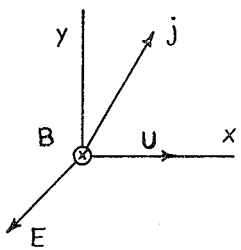
Fig. 1
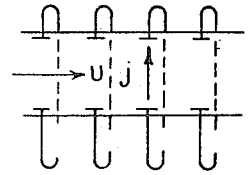
Fig. 4
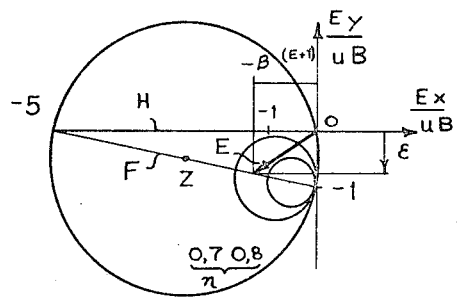
B = 5
Fig. 2
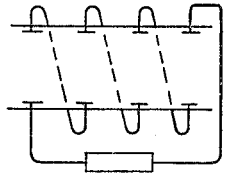
Fig. 5
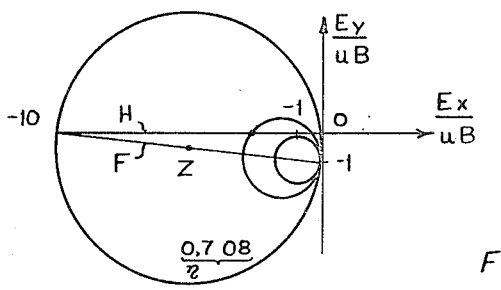
B = 10
Fig. 3
Fig. 6
INVENTORS
Ernst Jenny
Lang Shuen Dzung
BY
Pierce, Scheffler & Parker
Attorneys

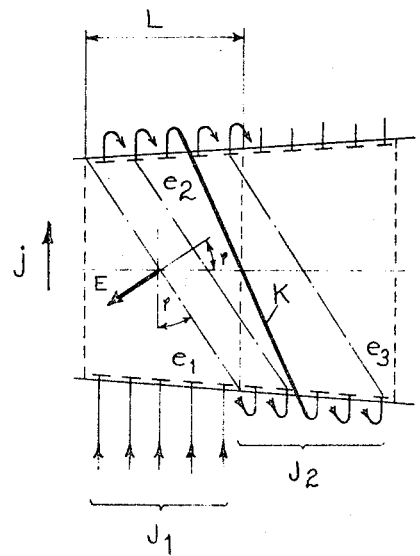
Fig. 7
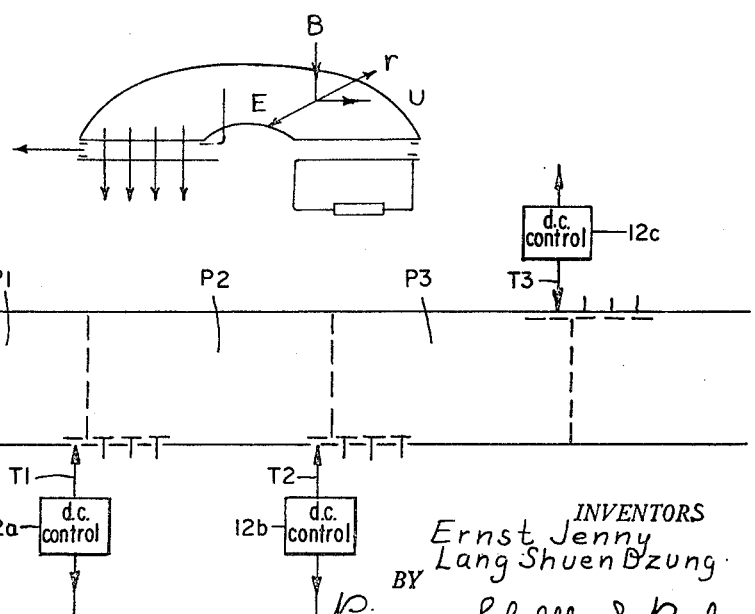
Fig. 8
Fig. 9
INVENTORS
Ernst Jenny
Lang Shuen Dzung
BY
Pierce, Scheffler & Parker
Attorneys

United States Patent Office 3,479,537
Patented Nov. 18, 1969

3,479,537
MAGNETOHYDRODYNAMIC MACHINE
Ernst Jenny, Baden, and Lang Shuen Dzung, Wettingen, Aargau, Switzerland, assignors to Aktiengesellschaft Brown Boveri & Cie, Baden, Switzerland, a joint-stock company
Filed July 6, 1966, Ser. No. 563,171
Claims priority, application Switzerland, July 19, 1965, 10,085/65
Int. Cl. H02k 45/00
U.S. Cl. 310—11      2 Claims

ABSTRACT OF THE DISCLOSURE

A process for operating an MHD generator wherein the overall efficiency of the generator is increased by splitting it into parts located along the direction of the gas flow, a portion of the part-generator's electric output-current is tapped off from an electrode at the exit of each part generator and the absolute value of the characteristic load factor exhibits a maximum in the vicinity of the entrance to each part generator and a minimum in the vicinity of the exit. The maximum is set by regulating the tapped-off currents and varying the length of the part-generators in the direction in which working medium flows.

---

The present invention relates to an improved process for operating a magnetohydrodynamic machine which for convenience will be hereinafter referred to as an "MHD" generator.

As is known, an MHD-generator comprises a duct having hot ionized gas flowing through it. If a magnetic field is produced perpendicularly to the direction of gas flow, an electrical voltage is induced perpendicularly to the direction of gas flow and the direction of the magnetic field. At two opposite sides of the duct perpendicular to the electrical field electrodes are provided.

The invention makes use of the known method of splitting up the electrodes into a plurality of pairs of electrodes distributed along the duct. From these pairs of electrodes electrical currents may be taken out to supply a load or several loads. The flow of electrical current induces an additional electrical voltage in direction of gas flow due to the Hall effect. This Hall effect is accentuated by MHD-generators wherein at least some of these electrodes are connected in series as regards the generated voltage and connected to a load, producing in this manner an electrical field strength having an essential component ($E_x$) in the direction of gas flow. This type of MHD generator is well known and called a cross-connected generator or a Hall type generator. It is also well known to form several groups of electrode pairs, the pairs of each group being essentially distributed over the whole length of the duct and connected in series and supplying a load so that for each group the load is connected to a separate electrode at the upstream end of the duct and to another one at the downstream end. Such a MHD generator of Hall type is well known e.g. from the U.S. Patent 3,294,990 (Dzung).

According to the invention such a MHD-generator of the Hall type is split up into parts, a portion of the part-generator's electric output-current being tapped off from at least one electrode at the exit of each part-generator and supplied to a load, while the remaining portion of said output current is further supplied to the next part-generator. The efficiency of the entire generator is increased by adjusting the load currents at the tapped off point such that the absolute value $|e_H|$ characteristic load factor $e_H$ defined later reaching a maximum allowable value at the vicinity of the upstream or entrance to each part generator, and a minimum allowable value at the vicinity of the downstream or exit from each part generator is set to $0.2 < |e_H| < 0.35$ for the maximum points and to $0.1 < |e_H| < .25$ for the minimum points. Since the exit of one part generator is the entrance of the next part generator, the abrupt change of the load factor is achieved by a suitable adjustment of the current tapped off at the connection point to the load or by varying the lengths of the part generators. The lengths of the part generators may be varied by shifting the current tapping points to other electrodes. The tapped off currents may be adjusted by varying the load distribution for each part generator.

The invention will be more precisely explained with the aid of the accompanying drawings and the theoretical considerations developed hereinafter.

FIGS. 1 to 8 of the drawings are diagrammatic views in explanation of the principles of operation of a generator of the MHD type; and FIG. 9 is a somewhat diagrammatic view of an MHD generator constructed in accordance with the present invention.

In order to obtain a general view of the conditions in an MHD generator as a first approximation, consideration may first of all be given to the behavior of generators with a plane flow of working medium, the magnetic induction being assumed to be normal to the flow. This case of plane flow has already been dealt with in detail theoretically, for example by Burgel (BB. News (1962), p. 493), whose nomenclature has in essentials been taken over in the following description.

As a first approximation, the following applies:

$$\text{Hall parameter } \beta = \frac{\delta_o B}{n_e \cdot e} \quad (1)$$

$\delta$ = scalar electrical conductivity
$n_e$ = density of free electrons
B = magnetic induction
$u$ = flow velocity
$e$ = elementary charge Let the $x$ direction be by definition (FIGURE 1) the direction of flow velocity $u$. The induction B shows downwards (neg $z$ axis), but is inserted positively in conventional fashion. The relationship between the current-density vector $\vec{j}$ ($A/m^2$) wherein A stands for ampere and $m$ for meter, and the electric-field vector $\vec{E}$ ($V/m$), wherein V stands for volts, is then reproduced by the following pair of equations:

$$j_x = \frac{\delta}{1+\beta^2}[E_x + \beta(E_x + uB)] \quad (2)$$

$$j_y = \frac{\delta}{1+\beta^2}[-\beta E_x + (E_y + uB)] \quad (3)$$

These equations may be represented after Burgel in circular diagrams, for example FIGURE 2 for $\beta = 5$; FIGURE 3 for $\beta = 10$. Loci of constant efficiency are circles; for example $\eta = 0.7 \ldots 0.8$ plotted as a range of interest. The power density is at a maximum at the center Z, and drops quadratically with the radius to a value of 0 on the great circle.

A known special case of an MHD generator with plane flow is the so-called "Faraday" generator (FIGURE 4). Since there is a sufficiently free choice of sizes available here, there are no difficulties in arriving at a usable size with this generator, even in the case of $p$, T, $\delta$, $\beta$, which vary widely in direction of flow. However, this generator needs a large number of independent loads.

The literature therefore proposes the use of cross-connected generators (FIGURE 5) or of so-called "Hall"

generators (FIGURE 6), which may be interpreted as special cases of cross-connected generators.

In the circular diagrams in FIGURES 2 and 3, the operating points of Faraday generators lie on the straight lines F, and those of Hall generators on the straight lines H. For the cross-connected generator, an additional continuity condition which has not hitherto been considered must be fulfilled.

Although the continuity conditions can also be mathematically illustrated for the general case, the restriction on the free choice of operating magnitudes imposed by this condition will be demonstrated with the aid of two special cases:

Case a

Consideration will first of all be given to the cross-connected generator, the case in which overall $j_x=0$, Equations 2 and 3 then lead to:

$$E_x = -\beta(E_y + uB) \quad (4)$$

$$j_y = \delta(E_y + uB) = \delta uB(\epsilon + 1); \quad \epsilon = \frac{L_y}{uB} \quad (5)$$

A quadratic duct $a^2 = A$ is furthermore to be assumed, $a$ representing the length of a side of a square duct. The electrodes are linked in crossed fashion; in FIGURE 7, K shows such a link; the others are indicated by arrows only. These links give rise to equipotential lines, for example $e_1, e_2, e_3 \ldots$ Perpendicular to them are the field vectors $\vec{E}$. The angle $\varphi$ follows from FIGURES 2 and 3, and with Equations 4 and 5 leads immediately to $$\tan \varphi = \frac{E_y}{E_x} = \frac{-\epsilon}{(\epsilon+1)\beta}$$

The length of a sector (with parallel independent electrodes) in FIGURE 7 becomes $$L = a \tan \varphi = \frac{-a\epsilon}{(\epsilon+1)\beta}$$

The current J emerges entirely from the lower electrodes of a sector into the duct, and proceeds to the opposite electrodes. Thence the current is conveyed externally on to the lower electrodes of the next sector, and there emerges again into the duct.

$$J = L \cdot a \cdot j_y = -\frac{a \cdot \epsilon \cdot a \delta_o uB(\epsilon+1)}{(\epsilon+1)B}$$

with $$\frac{\delta_o}{\beta} = \frac{n_e \cdot e}{B} \text{ (from 1) and } Au\varphi = \dot{m} \quad (6)$$

with $\varphi$ = density of gas, and $\dot{m}$ = mass flow of gas; J becomes equal to $$-\frac{\dot{m}}{\varphi} \cdot e \cdot n_e \cdot \epsilon \quad (7)$$

From the continuity condition $J_1 = J_2$ it follows that $$\frac{\epsilon_2}{\epsilon_1} = \frac{(n_e/\varphi)1}{(n_e/\varphi)2} \quad (8)$$

There is thus no longer any freedom in the choice of $\epsilon$ as in the case of the Faraday generator. Since $n_e$ now depends exponentially on T, $n_e$ drops along the generator considerably more rapidly than $\varphi$, i.e. $\epsilon_2/\epsilon_1 > 1$. $\epsilon$ is thus bound to increase. $\epsilon$ must already be 0.65 ... 0.8 at the entrance to the generator, since $\eta \approx \epsilon$. $\epsilon$ then rises rapidly to 1 (power density 0) and over (motor instead of generator).

Case b

Similar matter applies in the case of the Hall generator. With $E_y = 0$, Equation 2 gives $$j_x = \frac{\delta_o}{1+\beta_2} \cdot [E_x = \beta uB] \quad (9)$$

As shown by FIGURES 2 and 3, the Hall generator attains good efficiencies $\eta$ only for large values of $\beta$, since only then does the line H cut the circles at good $\eta$. For the purposes of the following fundamental exposition, it is therefore justifiable to neglect 1 with respect to $\beta^2$. With (1), (9) becomes $$j_x = n_e \cdot e \cdot u \left[ \frac{E_x}{\beta uB} + 1 \right] = n_e \cdot e \cdot u[\epsilon H + 1] \quad (10)$$

where $$\epsilon_H = \frac{E_x}{\beta uB}$$

With the continuity equations $$j_x \cdot A = J_x; \quad _o u \cdot A = \dot{m} \quad (11)$$

the result is $$\epsilon_H = \left(\frac{J_x}{\dot{m}e}\right) \frac{\varphi}{n_e} - 1 \quad (12)$$

At the entrance, $\epsilon_H$ is approximately $-0.2 \ldots -0.35$, again because it is necessary to choose a good $\eta \cdot \epsilon_H$. Thus, the first term on the right in Equation 12 has a magnitude of 0.65 ... 0.8. As already explained, $\varphi$ drops much more slowly than $n_e$ and the first term rises. $\epsilon_H$ rapidly becomes equal to 0 and then positive; the duct then no longer acts as a generator.

The Formulae 7 for Case $a$ and $b$ show, as a consequence of the said continuity designation, that neither $\epsilon$ nor $\epsilon_H$ can be effected by $u$ or B. Additional injection of seed material might affect $n_e$, but would probably be uneconomic.

At a definite generator cross-section, the load factors $\epsilon$ and $\epsilon_H$ reach a value corresponding to insufficient efficiency.

The problem of increasing the overall efficiency of the generator is solved according to the invention by the fact that $\epsilon$ and $\epsilon_H$ are restored to usable values from this cross-section downwards by tapping off current at this cross-section, that is to say by reducing the current flowing through the cross-section (see Equations 7 and 12), or in other words: that the generator is split up into parts in the direction of the flow vector of the working medium, current being tapped off at the exit of each part-generator.

The load factor $$\epsilon_H = \frac{E_x}{\beta uB}$$

not only reproduces the conditions in pure Hall generators, but also clearly characterizes the behavior of generators, in which quite generally the electric field strength exhibits an essential component in the direction of the flow vector of the working medium ($E_x$).

The said considerations also apply not only to the general cross-connected generator of linear type, in which current may be tapped off via electrodes which are intrinsically present in the crossed connection, but also to generators with rotationally symmetrical flow in which no actual electrodes for Hall or cross connection are present, since the electric current, proceeding tangentially, is completed inside the flow of the working medium itself (see FIGURE 8).

The following further observations should be made on the progression of $|e_H|$ at the boundary between two part-generators.

Tapping off the current causes $|e_H|$ to undergo a large variation along a short distance, of about the same order of magnitude as the width of the tap-off electrode, and rising from a minimum value in the vicinity of the exit of the part-generator disposed upstream as regards current to a maximum value in the vicinity of the entrance to the following part-generator disposed downstream as regards current. $\epsilon_H$ can be defined without any special difficulties at these extreme points.

FIG. 9 depicts a MHD-generator in accordance with the invention. The electrodes 10 positioned along the direction flow of the working medium are connected together by conductive lines 11, only one of which has been included in order to simplify the drawing. As previously explained, the whole direct current output of the generator is split up into several parts by tapping off adjustable load currents from electrodes at selected points along the flow path of the working medium, and also varying the length of the thus created "part generators" by shifting the current taps for the loads along the electrodes. This is depicted somewhat schematically in FIG. 9, wherein the "part-generators" along the flow path of the working medium are designated P1, P2 and P3, and with corresponding adjustable electrode taps being indicated by T1, T2 and T3. The variable direct current loads taken off from these taps are illustrated schematically by the blocks 12a, 12b and 12c legended "D.C. control."

We claim:

1. Process for operating an MHD generator in which the electric field strength exhibits an essential component ($E_x$) in the direction of the flow vector of the gaseous working medium characterized in that in order to increase the overall efficiency the generator is split up into parts in the direction of the gas flow vector, a portion of the part-generator's electric output current being tapped off from at least one electrode at the exit of each part-generator such that the absolute value $|e_H|$ of the characteristic load factor $e_H = E_x/\beta uB$ wherein $\beta$ represents the Hall parameter, B the magnetic induction and $u$ the flow velocity reaching a maximum allowable value in the vicinity of the entrance to each part generator and a minimum allowable value in the vicinity of the exit from each part generator, is set to $0.2 < |e_H| < 0.35$ for the maximum points and to $0.1 < |e_H| < 0.25$ for the minimum points by regulating the tapped-off currents and varying the length of the part-generators in the direction in which said gaseous working medium flows.

2. Process for operating an MHD generator according to claim 1, characterized in that the generator is provided with a plurality of pairs of electrodes, a part thereof forming a series connection as regards the generated voltages, while the part-generator's current being tapped off from said series connection at the exit of each part-generator.

References Cited

UNITED STATES PATENTS

| | | | |
|---|---|---|---|
| 3,294,990 | 12/1966 | Dzung | 310—11 |
| 3,324,318 | 6/1967 | Kantrowitz et al. | 310—11 |

DAVID X. SLINEY, Primary Examiner